United States Patent
Goldman et al.

(10) Patent No.: US 8,526,027 B2
(45) Date of Patent: Sep. 3, 2013

(54) METHOD AND APPARATUS FOR DETECTING A MISALIGNED PAGE

(75) Inventors: Stuart O. Goldman, Scottsdale, AZ (US); Karl F. Rauscher, Emmaus, PA (US)

(73) Assignee: Alcatel Lucent, Paris (FR)

( * ) Notice: Subject to any disclaimer, the term of this patent is extended or adjusted under 35 U.S.C. 154(b) by 646 days.

(21) Appl. No.: 12/726,491

(22) Filed: Mar. 18, 2010

(65) Prior Publication Data

US 2011/0228308 A1 Sep. 22, 2011

(51) Int. Cl.
*G06F 15/00* (2006.01)
*G06K 1/00* (2006.01)
*G06K 15/00* (2006.01)
*G06F 3/12* (2006.01)

(52) U.S. Cl.
USPC ........................................ 358/1.14; 358/1.15

(58) Field of Classification Search
None
See application file for complete search history.

(56) References Cited

U.S. PATENT DOCUMENTS

| | | | |
|---|---|---|---|
| 2004/0169899 A1 | 9/2004 | Wada | |
| 2004/0233467 A1* | 11/2004 | Namizuka | 358/1.13 |
| 2006/0152768 A1 | 7/2006 | Eschbach et al. | |
| 2007/0296997 A1* | 12/2007 | Taneda | 358/1.14 |
| 2008/0291492 A1* | 11/2008 | Miyagi et al. | 358/1.15 |
| 2009/0046329 A1 | 2/2009 | Tsuda | |
| 2009/0073518 A1 | 3/2009 | Wang et al. | |
| 2009/0190146 A1* | 7/2009 | Xu | 358/1.9 |

FOREIGN PATENT DOCUMENTS

EP 0 723 247 A1 7/1996

OTHER PUBLICATIONS

The International Search Report and the Written Opinion of the International Searching Authority, or the Declaration, in PCT/US2011/024826, Alcatel-Lucent USA Inc., Applicant, mailed Feb. 15, 2011, 11 pages.
Evans, J B: "Document Side Guide Setting Warning," Xerox Disclosure Journal, Xerox Corporation. Stamford, Conn., US, vol. 21, No. 6, Nov. 1, 1996, p. 365, XP000687165.

* cited by examiner

*Primary Examiner* — Douglas Tran
(74) *Attorney, Agent, or Firm* — Wall & Tong, LLP

(57) ABSTRACT

A capability is provided for detecting a misaligned page of a document. A method includes detecting that a page is misaligned and generating a control signal adapted for use in triggering presentation of an alarm indicating that the page is misaligned. A method includes detecting that a page is misaligned and initiating one or more control actions for the misaligned page. These and other methods may be performed on any suitable copy device, such as on a fax machine, a photocopy machine, a scanner, a photograph copying device, a user device, a network device, and the like, as well as devices having combinations of such functionality.

20 Claims, 4 Drawing Sheets

METHOD AND APPARATUS FOR DETECTING A MISALIGNED PAGE

FIELD OF THE INVENTION

The invention relates generally to alignment of pages and, more specifically but not exclusively, to detection of misaligned pages.

BACKGROUND

While most copy devices, e.g., photocopy machines, scanners, fax machines, and the like, include a small picture or symbol showing which side of a document should be face up when inserting the document into the automatic document feeder of the copy device, many users either become confused by the picture or even ignore the picture altogether. As a result, there is a chance that some users may inadvertently copy and/or transmit documents that include blank pages (e.g., a single page, a document with one or more pages wrong-side up, a multi-page document in which some or all of the pages are blank, and the like), and not even be aware of it until receiving a call from the intended destination of the document.

SUMMARY

Various deficiencies in the prior art are addressed by embodiments for detecting a misaligned page of a document.

In one embodiment, a method includes detecting that a page is misaligned and generating a control signal adapted for use in triggering presentation of an alarm indicating that the page is misaligned.

In one embodiment, a method includes, in response to detecting that at least one page of a document is misaligned, initiating at least one control action for the misaligned page. The at least one control action may include one or more of correcting the alignment of the misaligned page, triggering presentation of an alarm indicating that the page is misaligned, and the like, as well as various combinations thereof.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
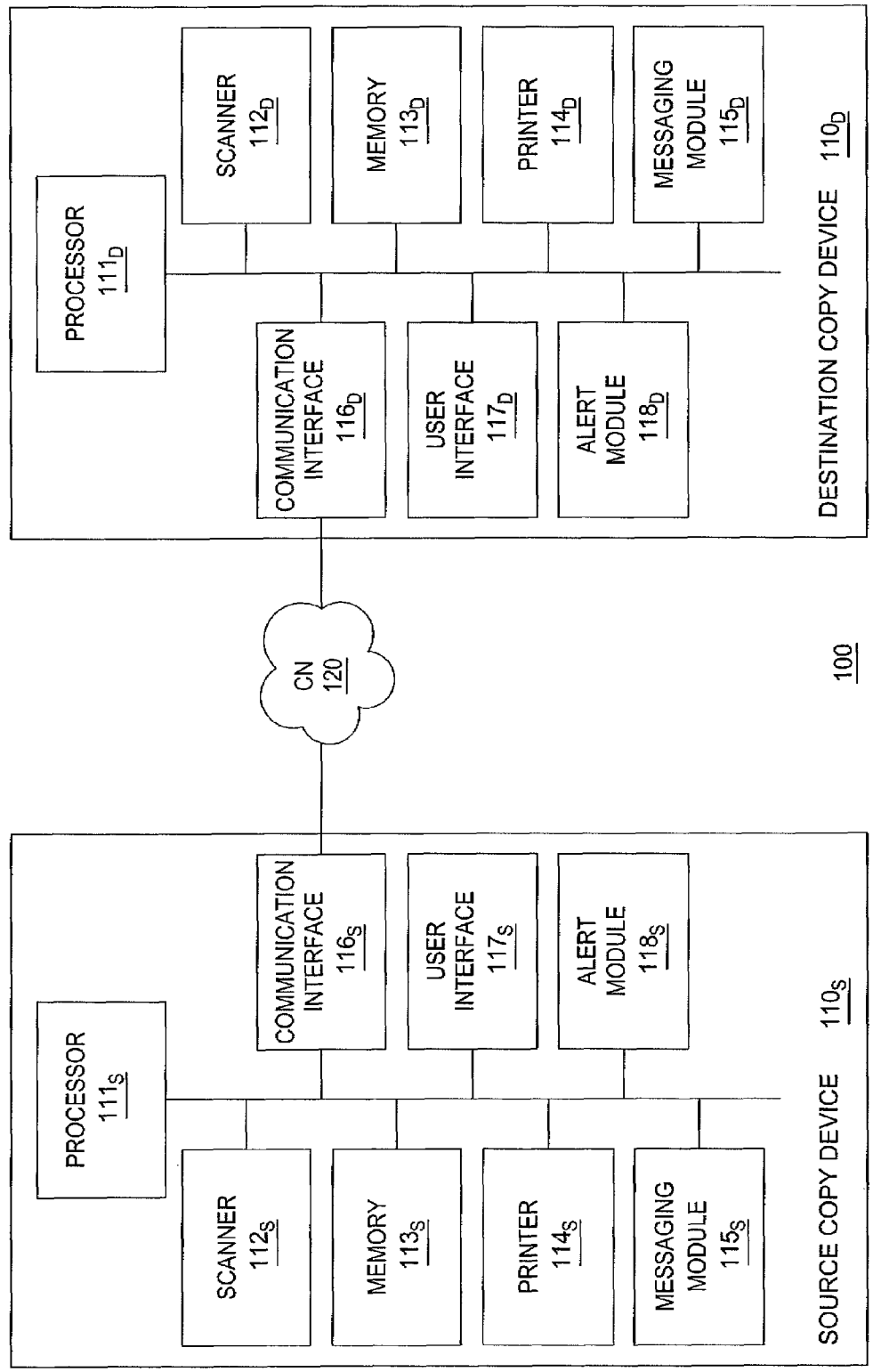
FIG. 1 depicts a high-level block diagram of an exemplary system for communicating documents.

A misaligned page detection and response capability is depicted and described herein. The misaligned page detection and response capability enables detection of a misaligned page of a document and, further, enables a response to detection of a misaligned page of a document.

The detection of a misaligned page may be performed using one or more techniques for detecting a misaligned page, which may depend on the manner in which the page is misaligned.

In one embodiment, for example, a page is detected as being misaligned when the page is detected as being blank or substantially blank. The detection of a page as being blank or substantially blank may indicate a number of types of misalignment. In one embodiment, for example, detection of a page as being blank or substantially blank may indicate that the page is inverted (e.g., that the two sides of the page were aligned incorrectly with respect to the function being performed, such as where a page is placed face down on a fax machine when it should be placed face up, where a page is placed face up on a copy machine when it should be placed face down, and the like).

A blank or substantially blank page, generally, is a page that does not include any useful or desired information and which may or may not include one or more other markings. For example, in the case of a blank page, the page generally will not include any other markings. Similarly, for example, in the case of a substantially blank page, the page may include other markings, e.g., such as due to defects in the sheet of paper, fingerprints, ink smears and smudges, one or more dirty components of the copy device in which the misaligned page detection and response capability is implemented (e.g., dust, dirt, or anything else that may cause markings on a page during scanning), and the like, as well as various combinations thereof. It will be appreciated that the detection of a substantially blank page, and, thus, the understanding of the term "substantially blank page" as used herein, may depend on the amount of markings that must be detected on the page before the page is determined to be a valid page (i.e., not detected as being blank or substantially blank) rather than a substantially blank page. As described herein, in at least some embodiments, the amount of other markings that must be detected before the page is determined to be a valid page may be a user configurable parameter (i.e., in at least some embodiments, users are provided with a capability to dynamically control the sensitivity with which blank and substantially blank pages are detected).

A blank or substantially blank page may be detected in any suitable manner. In one embodiment, for example, processing of a page for determining whether the page is blank or substantially blank is performed using contrast information associated with an electronic representation of the page. In one such embodiment, detection of a page as being blank or substantially blank may be performed using one or more of absolute contrast, variations in contrast, and the like, as well as various combinations thereof. The detection of a page as being blank or substantially blank may be performed using any other suitable contrast information. The detection of a page as being blank or substantially blank may be performed in any other suitable manner.

Although primarily described with respect to embodiments in which a page is detected as being a misaligned page upon detecting that the page is inverted via detection that the page is blank or substantially blank, it will be appreciated that a page may be detected as being misaligned using any other suitable means of detecting that the page is inverted.

In one embodiment, for example, a page is detected as being a misaligned page upon detecting that content on the page is oriented in an unusable and/or undesirable manner. The detection that the content on the page is oriented in an unusable and/or undesirable manner may indicate one or more of a number of types of misalignment.

In one embodiment, for example, detection that the content on the page is oriented in an unusable and/or undesirable manner includes detection that the page is rotated by some angle within its plane with respect to the orientation of the other pages. For example, where a document having a number of pages is being copied, and one of the pages is upside down (i.e., rotated by 180 degrees with respect to the other pages), detection that the page is rotated by some angle within its plane with respect to the orientation of the other pages may result in detection that the content on the page is oriented in an unusable and/or undesirable manner. This embodiment includes pages that are rotated by 90 degrees in either direction, rotated by 180 degrees (i.e., the page is upside down), and the like, as well as various combinations thereof.

In one embodiment, for example, detection that the content on the page is oriented in an unusable and/or undesirable manner includes detection that the content of the page is rotated by some angle with respect to the necessary or preferred orientation of the content on the page. For example, where text printed on an 11×8.5 inch sheet of paper is expected to be aligned such that the text on each of the rows is parallel to the shorter sides of the paper (and, thus, perpendicular to the longer sides of the paper), detection that the lines of text are rotated by at least some angle with respect to the expected orientation (e.g., greater than 5%, greater than 10%, or any other suitable threshold) may result in detection that the content on the page is oriented in an unusable and/or undesirable manner.

It will be appreciated that many other types of unusable and/or undesirable orientations of content on a page may be detected for purposes of identifying misaligned pages.

The determination as to whether content of a page is oriented in an unusable and/or undesirable manner may be performed in any suitable manner. In one embodiment, for example, the determination as to whether content of a page is oriented in an unusable or undesirable manner may be performed using a pattern recognition technique (e.g., using contrast information associated with the page for detecting a contrast pattern(s) indicative that the content on the page is oriented in an unusable and/or undesirable manner). In one embodiment, for example, the determination as to whether content of a page is oriented in an unusable or undesirable manner may be performed using an optical character recognition (OCR) technique. A combination of such techniques may be used for determining whether content of a page is oriented in an unusable and/or undesirable manner. The determination as to whether content of a page is oriented in an unusable and/or undesirable manner may be performed in any other suitable manner.

Although primarily described with respect to embodiments in which a page is detected as being a misaligned page upon detecting that content on the page is oriented in an unusable and/or undesirable, it will be appreciated that a page may be detected as being misaligned using any other suitable means of detecting that content on the page is oriented in an unusable and/or undesirable.

The response to detection of a misaligned page may include one or more responses, such as one or more of generation of a control signal adapted for use in triggering presentation of an alarm indicative of detection of the misaligned page, initiating automatic correction of the alignment of the misaligned page, and the like, as well as various combinations thereof.

The misaligned page detection and response capability may be used for detecting a misaligned page of a document being copied (e.g., being copied for one or more of printing one or more hard copies of the document, electronic storage of the document, electronic transmission of the document, and the like, as well as various combinations thereof), a document previously copied (e.g., a copy of a document received at a fax machine, a user device, a network device, or other similar device), and the like, as well as in other applications in which detection of a misaligned page may be useful.

A document, generally, includes one or more pages of information. A document may be represented as a hard copy and/or as a soft copy. A hard copy of a document may be represented using one or more sheets of paper. The sheets of a hard copy may include any sheets suitable for use with embodiments of the misaligned page detection and response capability (e.g., as the misaligned page detection and response capability may be provided at a source copy device or a destination copy device, the sheet(s) of the document may correspond to sheets from which an electronic representation of the document is generated or sheets onto which an electronic representation of the document may be printed). A soft copy of a document may be provided in any suitable format, which may be represented using a word processing application, an image rendering application, and like applications adapted for use in displaying documents. A document may be maintained using an electronic representation of the document, where an electronic representation of the document includes information adapted for use in presenting the document. As such, the term "document" is intended to encompass any page or collection of pages which may have content thereon, such as text-based documents, photographs, and the like, as well as various combinations thereof. It will be appreciated that such definitions are provided for purposes of explaining at least some embodiments of the misaligned page detection and response capability and, thus, that other suitable definitions may be applied where appropriate in accordance with at least some embodiments of the misaligned page detection and response capability.

These and various other embodiments of the misaligned page detection and response capability may be better understood by way of reference to FIG. 1-FIG. 4.

FIG. 1 depicts a high-level block diagram of an exemplary system for communicating documents. The system 100 includes two copy devices, a source copy device (SCD) $110_S$ and a destination copy device (DCD) $110_D$ (which may be referred to collectively herein as copy devices (CDs) 110), which are capable of communication via a communication network (CN) 120.

The SCD $110_S$ is any device suitable for generating a copy of a document and performing one or more of printing the copy of the document, storing the copy of the document, transmitting the copy of the document to DCD $110_D$ via CN 120, and the like, as well as various combinations thereof. In one embodiment, the SCD $110_S$ is configured for detecting a misaligned page and supporting other functions of the misaligned page detection and response capability.

As depicted in FIG. 1, in one exemplary embodiment the SCD $110_S$ includes a processor $111_S$, a scanner $112_S$, a memory $113_S$, a printer $114_S$, a messaging module $115_S$, a communication interface $116_S$, a user interface $117_S$, and an alert module $118_S$. As further depicted in FIG. 1, the processor $111_S$ is configured for communicating with each of the other components of SCD $110_S$ in support of the misaligned page detection and response capability. Although primarily depicted and described with respect to an embodiment in which communication between each of the components of SCD $110_S$ is via processor $111_S$, it will be appreciated that communication between the various components of SCD $110_S$ may be implemented in any suitable manner.

The SCD $110_S$ may be any suitable copy device. For example, SCD $110_S$ may be a fax machine, a photocopy machine, a scanner, a multi-function machine supporting multiple such functions (e.g., a device supporting two or more of photocopy, scan, fax, and other similar capabilities), a photograph copy device (e.g., a device in which a photograph is inserted and a copy of the photograph is printed, stored, and/or transmitted), and the like. The general design and operation of such devices will be understood by one skilled in the art. It will be appreciated that, depending on the device type of SCD $110_S$, in certain embodiments one or more of the components of SCD $110_S$ may be deemed to be optional. For example, printer $114_S$ may be optional at least because (1) it may not be present in some types of devices which may be used as SCD $110_S$ (e.g., in a scanner or other similar device without print capabilities) and (2) where it is present in a device that is used as SCD $110_S$, in at least some embodiments there is no need for use of printer $114_S$ in the copying-based function being performed (e.g., when generating an electronic copy of a document for storage at SCD $110_S$, when transmitting a copy of a document to DCD $110_D$ (e.g., printer $114_S$ is not used to fax a document to another fax machine although it will be appreciated that printer $114_S$ may be used to print a status sheet showing the status of the fax transmission; printer $114_S$ is not used to email a document from a photocopier to a computer, and so forth), and the like). For example, messaging module $115_S$ may be optional at least because (1) it may not be present in some types of devices which may be used as SCD $110_S$ (e.g., in a fax machine or other similar device without email and/or other messaging capabilities) and (2) where it is present in a device that is used as SCD $110_S$, in at least some embodiments there is no need for use of messaging module $115_S$ in the copying-based function being performed (e.g., when generating an electronic copy of a document for storage at SCD $110_S$, when transmitting a copy of a document to DCD $110_D$ using a transmission means other than messaging, and the like). The presence/absence and/or use/nonuse of these and other components of SCD $110_S$, such that some components of SCD $110_S$ may be considered to be optional in certain situations, will be understood by one skilled in the art.

The DCD $110_D$ is any device suitable for receiving a copy of a document from SCD $110_S$ via CN 120 and performing one or more of storing the copy of the document, presenting the copy of the document (e.g., via printing the copy of the document, displaying the copy of the document on a display, and the like), and the like. In one embodiment, DCD $110_D$ is configured for detecting a misaligned page and supporting other functions of the misaligned page detection and response capability.

As depicted in FIG. 1, in one exemplary embodiment the DCD $110_D$ includes a processor $111_D$, a scanner $112_D$, a memory $113_D$, a printer $114_D$, a messaging module $115_D$, a communication interface $116_D$, a user interface $117_D$, and an alert module $118_D$. As further depicted in FIG. 1, the processor $111_D$ is configured for communicating with each of the other components of DCD $110_D$ in support of the misaligned page detection and response capability. Although primarily depicted and described with respect to an embodiment in which communication between each of the components of DCD $110_D$ is via processor $111_D$, it will be appreciated that communication between the various components of DCD $110_D$ may be implemented in any suitable manner.

The DCD $110_D$ may be any suitable copy device, which, in at least some embodiment, may depend on the device type of SCD $110_S$. For example, where SCD $110_S$ is a fax machine, DCD $110_D$ also may be a fax machine or any other device suitable for receiving the copy of the document from a fax machine. For example, where SCD $110_S$ is a photocopy machine, a scanner, or any other similar copy device, the DCD $110_D$ may be any device suitable for receiving and handling a copy of a document (e.g., storing a copy of a document, presenting a copy of a document (e.g., such as by printing and/or displaying the document), and the like). As such, in at least some embodiments, the DCD $110_D$ may encompass devices that do not support, or at least do not typically support, copy capabilities, such as network devices (e.g., network servers, network storage devices, and the like), end user devices (e.g., computers, cellular phones, PDAs, and the like), and the like. In such embodiment, it will be appreciated that the copy of the document may be propagated to such devices (e.g., network devices, user devices, and the like), via any suitable means of conveying the copy of the document (e.g., as an attachment in an email, MMS, or other suitable messaging format; as a packetized representation of the copy of the document; and the like). Thus, although primarily depicted and described herein as being a device supporting copy functions, it will be appreciated that, in at least some embodiments, the DCD $110_D$ may only be referred to as a copy device because it is involved in receiving a copy of a document, not necessarily because it is capable of making a copy in the same manner as a fax machine, photocopier, scanner, photograph copy device, and the like. The general design and operation of such devices will be understood by one skilled in the art.

As described herein with respect to SCD $110_S$, it will be appreciated that, depending on the device type of DCD $110_D$, in certain embodiments one or more of the components of DCD $110_D$ may be deemed to be optional. For example, scanner $112_D$ and/or printer $114_D$ may be optional at least because (1) one or both of these may not be present in some types of devices which may be used as DCD $110_D$ and (2) where one or both of these are present in a device that is used as DCD $110_D$, in at least some embodiments there is no need for use of one or both of these capabilities. For example, with respect to item (1), where DCD $110_D$ is a user device such as a PDA, cell phone, or other similar user device, it is unlikely that the user device will include a scanner $112_D$ or a printer $114_D$ (although it will be appreciated that such user devices may be connected to a scanner and/or printer for using the scanner and/or printer as a peripheral(s)). For example, with respect to item (2), where DCD $110_D$ is a fax machine including a scanner $112_D$, scanner $112_D$ is not used when a fax is received from SCD $110_S$. Similarly, for example, with respect to item (2), where the SCD $110_S$ is a photocopy machine and the DCD $110_D$ is a computer having a combined printer/scanner as a peripheral, the user may simply choose to view the received document on a display screen of the computer rather than printing the document. Thus, the presence/absence and/or use/nonuse of these and other components of DCD $110_D$, such that some components of DCD $110_D$ may be considered to be optional in at least some embodiments, will be understood by one skilled in the art.

Although primarily depicted and described herein with respect to the functions of SCD $110_S$ required by SCD $110_S$ when SCD $110_S$ is operating as the source of a copy of a document and with respect to functions of DCD $110_o$ required by DCD $110_D$ when DCD $110_D$ is operating as the destination of a copy of a document, it will be appreciated that many of the types of copy indicated herein as being suitable for use as SCD $110_S$ and DCD $110_D$ will be configured for operating as both a source and destination of copies of documents and, thus, will include both types of functions.

The CN 120 may be any communication network that is suitable for supporting communications between a source copy device and a destination copy device. For example, in embodiments in which SCD 110$_S$ and DCD 110$_D$ each are fax machines, CN 120 may be any communication network suitable for supporting fax transmissions (e.g., a Public Switched Telephone Network (PSTN) or other suitable network). For example, in embodiments in which SCD 110$_S$ and DCD 110$_D$ are a photocopy machine and a user computer, respectively, CN 120 may be any communication network suitable for supporting emailing of copies of documents (e.g., a local area network (LAN), a wide area network (WAN), the Internet, and the like, as well as various combinations thereof). The types of communication networks which may be used for supporting transmissions between CDs 110 will be understood by one skilled in the art. It will be appreciated that in at least one embodiment, CN 120 will be optional (e.g., such as where a user is making a copy of a document locally (e.g., for printing a hard copy of the document locally, for storing an electronic representation of the document locally, and the like) without transmitting a copy of the document to any other device via a network).

As described herein, each of the CDs 110 includes components that cooperate to provide various functions of the misaligned page detection and response capability. A description of exemplary embodiments of such components follows. It will be appreciated that, for purposes of clarity in describing functions of SCD 110$_S$ and DCD 110$_D$, components common to SCD 110$_S$ and DCD 110$_D$ may be referred to collectively, where applicable, using the portion of the reference number common to the components of SCD 110$_S$ and DCD 110$_D$, and, further, may be referred to individually, where applicable, using the full reference numbers.

The processors 111 are configured for controlling the functionality of CDs 110, respectively. The processors 111 are configured for executing one or more methods for providing various aspects of the misaligned page detection and response capability.

The scanners 112 are configured for scanning documents for purposes of generating electronic representations of the documents. The scanners 112 may be used to scan documents for any purposes, e.g., for printing one or more copies of the document, for storing a copy of the document which may be viewed as a soft copy via a display, for transmitting a copy of the document to one or more remote locations, and the like, as well as various combinations thereof. The operation of the scanners 112 in scanning a document and generating an electronic representation of the document will be understood by one skilled in the art.

The memories 113 are configured to store programs, data, and other information associated with operation of CDs 110, including programs, data, and other information associated with providing the misaligned page detection and response capability.

The memories 113 store programs which, when executed by the processors 111, respectively, provide various functions in support of the misaligned page detection and response capability.

The memories 113 also may store one or more parameters associated with the misaligned page detection and response capability.

In one embodiment, for example, memories 113 may store one or more parameters indicative of when the misaligned page detection and response capability is to be used. For example, such parameters may be used to specify that the misaligned page detection and response capability is to be used only for outgoing documents, only for incoming documents, for all outgoing and incoming documents, for documents sent to specific destinations and/or received from specific sources (e.g., specific fax numbers, email addresses, and the like), and the like, as well as various combinations thereof.

In one embodiment, for example, memories 113 may store one or more parameters controlling the alarms to be presented upon detection of a misaligned page of a document. For example, such parameters may be used to specify the types of alarms to be presented upon detection of a misaligned page (e.g., audible only, visual only, and the like, as well as various combinations thereof). For example, such parameters may be used to specify characteristics of alarm presentation, such as frequency of presentation (e.g., how often a sound is played, how often a light(s) flashes, and the like), duration of presentation (e.g., for five minutes after detection, until a user acknowledges the alarm, and the like), and/or any other suitable characteristics, as well as various combinations thereof. It will be appreciated that any other suitable characteristics of alarm presentation may be controlled. It will be further appreciated that any suitable combinations of such parameters may be used to control alarm presentation. Such combinations of characteristics/parameters may be referred to herein as alarm presentation models. In embodiments in which different alarm presentation models may be used in different scenarios, such parameters may be used to specify the configuration of alarm presentation models. For example, such parameters may be used to specify models such as: (a) a first type of alarm is used for inverted pages and a second type of alarm is used for incorrectly oriented pages, (b) a first type of audible alarm is used for outgoing documents and a second type of audible alarm is used for incoming documents, (c) an audible alarm is used for outgoing documents and a visual alarm is used for incoming documents, (d) a first type of visual alarm is used for documents associated with a first source(s)/destination(s) and a second type of visual alarm is used for documents associated with a second source(s)/destination(s). Such parameters may be used to specify any other suitable alarm presentation models in which different alarms may be used under different conditions. In embodiments in which status information is included with alarms, such parameters may be used to specify the type of status information (e.g., the page number of the misaligned page, the type or potential type of misalignment of the page, and the like, as well as various combinations thereof), the manner in which the status information is presented (e.g., via a display means, via printing of a status message, and the like), and the like, as well as various combinations thereof. It will be appreciated that any other suitable granularity of control over presentation of alarms may be supported.

In one embodiment, for example, memories 113 may store one or more detection sensitivity parameters indicative of the detection sensitivity associated with detection of misaligned pages. In one embodiment, a single detection sensitivity parameter may be used to control detection sensitivity for multiple misalignment types. In one embodiment, for example, multiple detection sensitivity parameters may be used to control detection sensitivity for multiple misalignment types (e.g., a detection sensitivity parameter for controlling detection of blank or substantially blank pages, a detection sensitivity parameter for controlling detection of pages oriented in an unusable or undesirable manner, and the like). In such embodiments, the detection sensitivity parameter(s) may be configured manually and/or automatically.

With respect to a detection sensitivity parameter for controlling detection of blank or substantially blank pages, it will be appreciated that increasing and decreasing of the detection sensitivity parameter may result in fewer or more pages being detected as being blank or substantially blank pages. For example, where pages have or are expected to have markings that may otherwise prevent them from being detected as blank pages, even though the pages are devoid of any useful information (e.g., where lined paper is used; where the copy device is dirty from dust, dirt, fingerprints, and the like, which may cause markings on the pages being copied/scanned; and the like), the detection sensitivity parameter may be set such that the pages are detected as being blank in spite of having such markings thereon. Similarly, for example, where at least some pages are expected to include small amounts of useful information but otherwise be devoid or substantially devoid of any markings, the detection sensitivity parameter may be set such that the pages are not detected as being blank.

The detection sensitivity parameter(s) for controlling detection of blank or substantially blank pages may be specified in any suitable manner.

In one embodiment, for example, where an absolute contrast of a page is used for determining whether or not that page is deemed to be blank, the detection sensitivity parameter may be specified as a particular value or set of values.

In one embodiment, for example, where an absolute contrast or a variation in the contrast of a page is used for determining whether or not that page is deemed to be blank, the detection sensitivity parameter may be specified as a threshold value. In one such embodiment, for example, where the detection sensitivity parameter is specified as a threshold value: (a) detection of an absolute contrast or variation in contrast that is below the threshold results in detection of the page as being blank and (b) detection of an absolute contrast or variation in contrast that is above the threshold results in a determination that the page is not blank or substantially blank (and, thus, no action is taken). It will be appreciated that, as this is at least partially a mathematical determination, various other relationships between the detection sensitivity parameter and the associated contrast values may be used in order to enable detection of blank and substantially blank pages.

With respect to a detection sensitivity parameter for controlling detection of pages that are oriented in an unusable or undesirable manner, it will be appreciated that increasing and decreasing of the detection sensitivity parameter may result in fewer or more pages being detected as being oriented in an unusable or undesirable manner (and, thus, misaligned). For example, where pages have or are expected to have content that is aligned at an angle to the expected alignment of the content on the page (e.g., such as where copy devices with automatic document feeders may allow pages to be fed in at a slight angle such that the content on the page at the source copy device and the destination copy device is skewed), the detection sensitivity parameter may be set such that these pages are not detected as being misaligned (e.g., so as to avoid continual detection of misaligned pages on copy devices that send and receive faxes which may tend to include content that is oriented at a slight angle to the page). Similarly, for example, where pages are not expect to (or cannot) have content that is aligned at an angle to the page, the detection sensitivity parameter may be set such that even small amounts of skew of the content on the page are detected such that the pages may be detected as being misaligned pages.

The detection sensitivity parameter(s) for controlling detection of pages oriented in an unusable or undesirable manner may be specified in any suitable manner.

In one embodiment, for example, where optical character recognition techniques are used for determining whether or not the orientation of the page is unusable or undesirable, the detection sensitivity parameter may be specified as a threshold number or percentage of characters which are recognizable or unrecognizable.

In one embodiment, for example, where contrast pattern recognition techniques are used for determining whether or not the orientation of the page is unusable or undesirable, the detection sensitivity parameter may be specified as pattern recognition information suitable for use in recognizing contrast patterns which may be indicative that orientation of the content on the page is unusable or undesirable.

It will be appreciated that, in this manner, by enabling user control of detection sensitivity via the detection sensitivity parameter(s), users are able to fine tune the operation of the misaligned page detection and response capability.

It will be appreciated that the foregoing parameters may be configured in any suitable manner. In one embodiment, at least a portion of these parameters may be pre-configured on CDs 110 (e.g., as initial factory settings). In one embodiment, at least a portion of these parameters may be dynamically configured on CDs 110. The parameters may be configured locally (e.g., via the user interfaces 117 of CDs 110) and/or remotely (e.g., via a remote network connection to the CDs 110).

It will be further appreciated that, although primarily described within the context of a description of memories 113, the foregoing parameters may be considered more generally as being available on and manageable by the respective CDs 110 and, thus, that such parameters may be maintained in any suitable manner (e.g., such parameters may be defined and managed within one or more programs stored within memories 113 and executed by processors 111 for providing the misaligned page detection and response capability, defined and managed using one or more other components of the CDs 110, and the like, as well as various combinations thereof).

The memories 113 store the electronic representation of a document. In one embodiment, for example, in the case of memory $113_S$ on SCD $110_S$ (e.g., for a document to be copied and printed, stored, and/or transmitted), memory $113_S$ stores the electronic representation of the document to be copied and printed, stored, and/or transmitted, which is generated by the scanner $112_S$. In one embodiment, for example, in the case of memory $113_D$ on SCD $110_D$ (e.g., for a received document, which is received as an electronic representation of the document), memory $113_D$ stores the electronic representation of the document (e.g., for maintaining the copy of the document on DCD $110_D$, for use in presenting the copy of the document via printing of the document using printer $114_D$, and/or display of the document via user interface $117_D$ and the like).

The memories 113 may include any type of memories suitable for storing such information.

The printers 114 are configured for printing documents. For example, where SCD $110_S$ is a photocopy machine, SCD $110_S$ may print copies of a document scanned on SCD $110_S$. For example, where CDs 110 are fax machines, DCD $110_D$ may print a copy of a fax received at DCD $110_D$ from SCD $110_S$. The operation of the printers 114 in printing documents will be understood by one skilled in the art. As described herein, the presence and/or use of the printers 114 within and/or by CDs 110 may be optional in at least some embodiments. In one embodiment, printers 114 are adapted for use in presenting an alarm indicating detection of a misaligned page of a document.

The messaging modules 115 are configured for supporting messaging capabilities for CDs 110, respectively. For example, messaging modules 115 may be configured to support messaging for transport of documents between SCD $110_S$ and DCD $110_D$ (e.g., email messaging or any other type(s) of message suitable for sending copies of documents). For example, messaging modules 115 may be configured to support messaging for propagating messages indicative of alarms generated in response to detection of a misaligned page of a document (e.g., using email messaging, Short Message Service (SMS) messaging, Multimedia Messaging Service (MMS) messaging, Instant Messaging, and the like, as well as various combinations thereof). The messaging modules 115 may support any other messaging capabilities suitable for use in devices such as fax machines, photocopy machines, scanners, user devices, and the like.

The communication interfaces 116 are configured for interfacing with CN 120, thereby enabling communication between SCD $110_S$ and DCD $110_D$ via CN 120. The communication interfaces 116 may be implemented in any suitable manner, which may depend on factors such as the type of CDs 110 within which the communication interfaces 116 are used, the type(s) of environment(s) within which the CDs 110 are used (e.g., office, home, and the like), the type of CN 120 to which the CDs 110 are connected, and the like, as well as various combinations thereof. For example, communication interfaces 116 may include a modem for communication via telephone lines, an Ethernet communication capability for communication via Ethernet networks, and the like, as well as various combinations thereof. The communication interfaces 116 may support any other suitable communications capabilities The user interfaces 117 are configured for controlling the operation of CDs 110. The user interfaces 117 may include any suitable user interface means, such as presentation means (e.g., speakers, LED displays, display screens and/or monitors supporting graphical user interfaces, and the like), control means (e.g., buttons, a keypad, a keyboard, a mouse, a touch screen, and the like), and the like, as well as various combinations thereof. It will be appreciated that the user interfaces 117, and the associated user interface means, may be different for different types of CDs 110. The design, operation, and capabilities of the user interfaces of fax machines, scanners, photocopiers, computers, cellular phones, and like devices which may be used as CDs 110 will be understood by one skilled in the art.

In one embodiment, for example, the user interface $117_S$ on SCD $110_S$ may be used to initiate copying of a document (e.g., for printing, storage, and/or transmission), to specify parameters associated with copying of the document (e.g., such as the number of copies, contrast ratio, and like parameters which may be specified on fax machines, photocopy machines, scanners, as well other similar parameters which may be specified on other types of copy devices), to specify a destination(s) of the document that is being copied for transmission (e.g., by entering or selecting a fax number, entering or selecting an email address, and the like), and the like, as well as various combinations thereof.

In one embodiment, for example, the user interface $117_D$ on DCD $110_D$ may be used to access a received copy of a document for storing, viewing, and/or printing the received copy of the document. For example, where DCD $110_D$ is a fax machine receiving a copy of a document from a source fax machine, user interface $117_D$ is unlikely to be used when the fax is received; rather, upon receiving an electronic representation of the copy of the document, the fax machine will automatically process the electronic representation of the copy of the document and print the copy of the document without requiring interaction from a user. For example, where DCD $110_D$ is a computer, cellular phone, or other user device receiving a copy of a document from a source photocopy machine, user interface $117_D$ may be used to view, store, and/or print the copy of the document (e.g., such as where the user opens an email and selects the attachment including the copy of the document for storing and/or opening the copy of the document).

In one embodiment, user interfaces 117 are adapted for enabling users to control configuration of one or more parameters associated with the misaligned page detection and response capability. In one such embodiment, for example, user interfaces 117 may be configured to enable a user to control one or more of: one or more parameters indicative of when the misaligned page detection and response capability is to be used, one or more of parameters indicative of the response(s) to be initiated in response to detection of a misaligned page of a document (e.g., whether or not automatic correction of the alignment is to be performed, the alarms to be presented upon detection of a misaligned page of a document, and the like, as well as various combinations thereof), a detection sensitivity parameter associated with detection of misaligned pages, and the like, as well as various combinations thereof. These parameters are described herein in conjunction with a description of memories 113 which may be used to store and maintain such parameters.

The configuration of parameters associated with the misaligned page detection and response capability may be controlled in any suitable manner, which may depend on the type of user interface available on the CD 110.

In one embodiment, for example, a photocopier, a fax machine, a scanner, or other similar copy device may include a button or buttons specific to the control of one or more such parameters, which, when selected by a user, will change the associated parameter(s) in the manner specified by the user (e.g., similar to contrast ratio buttons and other similar controls typically found on such copy devices), and which setting may be displayed (temporarily or permanently) via an associated display means. For example, a fax machine, a photocopier, a scanner, or other similar copy device may include a button or buttons, specific to control of the detection sensitivity parameter, which, when selected by a user, will increase or decrease the sensitivity with which misaligned pages are detected. Other buttons specific to other parameters or groups of parameters also may be used.

In one embodiment, for example, a fax machine, a photocopier, a scanner, a computer, or other similar copy device may include a capability for enabling setting of one or more such parameters via a display means and associated user control means of the copy device. For example, a user of a copy device may use one or more of a mouse, a keyboard, a touch screen, and like control means, to access a configurations/settings portion(s) of an application(s) running on the copy device for purposes of reviewing and setting such parameters.

It will be appreciated that, although described with respect to specific examples, any such parameters may be set using any suitable user interface capabilities, which may depend on the type of copy device being used.

In one embodiment, user interfaces 117 are adapted for use in presenting an alarm indicating detection of a misaligned page. In one embodiment, the user interfaces 117 present the alarms in response to instructions from the processors 111, respectively (e.g., upon detection, by processor 111, of a misaligned page of a document, the processor 111 generates a control signal and provides the control signal to the user interface 117 for triggering the user interface to present an alarm indicating detection of the misaligned page), which may then be presented using any suitable user interface means as described herein.

The alert modules 118 are configured for use in presenting an alarm indicating detection of a misaligned page of a document. In one embodiment, the alert modules 118 present the alarms in response to instructions from the processors 111, respectively (e.g., upon detection, by processor 111, of a misaligned page of a document, the processor 111 generates a control signal and provides the control signal to the alert module 118 for triggering the alert module to present an alarm indicating detection of the misaligned page). The alert modules 118 may include any means for presenting an alarm, which may depend on the type of alarm to be presented. For example, alert modules 118 may include one or more audible presentation means (e.g., one or more speakers, means for making the CD 110 vibrate, and the like) for presenting an audible alarm. For example, alert modules 118 may include one or more visual presentation means (e.g., lights, such as bulbs, LEDs, and the like; display means for displaying messages; and the like) for presenting a visual alarm. In one embodiment, in which the alarm indicating detection of a misaligned page of a document is presented via user interfaces 117, alert modules 118 may be omitted or may be integrated with user interfaces 117 (or at least the capabilities of alert modules 118 may be incorporated into user interfaces 117).

Although primarily depicted and described with respect to specific functions and capabilities, it will be appreciated that CDs 110 each may include fewer or more, as well as different, types of functions and capabilities. In one embodiment, for example, one or both of the CD 110 may include an optical character recognition (OCR) capability. In one embodiment, for example, one or both of the CDs 110 may include an automatic document feeder (e.g., fax machines, photocopy machines, and other such devices typically include automatic document feeders), the operation of which will be understood by one skilled in the art. The CDs 110 each may include any other suitable functions and/or capabilities. It will be appreciated that the inclusion of such functions and capabilities within CDs 110 may depend on the type of device used to implement the CDs 110, respectively.

Although primarily depicted and described herein with respect to embodiments in which certain portions of the misaligned page detection and response capability are performed by specific components of CDs 110 and/or by specific combinations of components of CDs 110, it will be appreciated that the various functions of the misaligned page detection and response capability may be performed in any other suitable manner (e.g., such as using different components, different combinations of components, and the like). Thus, the more general operation of CDs 110 in providing the misaligned page detection and response capability may be better understood with respect to FIG. 2 and FIG. 3.

Figure 2:
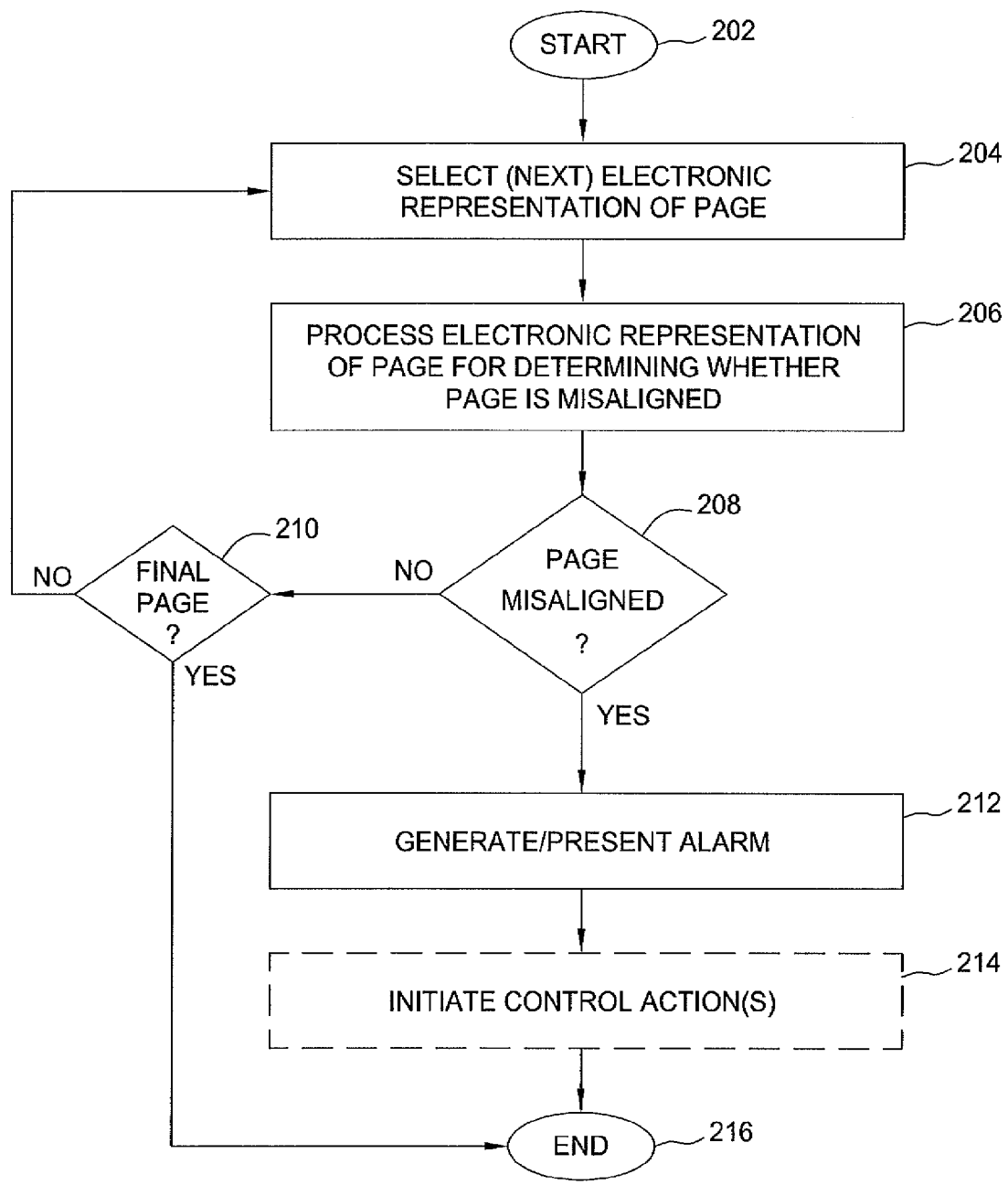
FIG. 2 depicts one embodiment of a method for detecting a misaligned page of a document and responding to detection of a misaligned page of a document.

FIG. 2 depicts one embodiment of a method for detecting a misaligned page of a document and responding to detection of a misaligned page of a document. The method 200 of FIG. 2 may be performed by a source copy device or a destination copy device, with some differences as described in conjunction with FIG. 2.

At step 202, method 200 begins.

At step 204, an electronic representation of a page of a document is selected.

The selection of an electronic representation of a page of a document may include any action or actions suitable for enabling processing of the electronic representation of the page of the document for determining whether the page is misaligned (e.g., such as receiving the electronic representation of the page, retrieving the electronic representation of the page from memory, accessing the electronic representation of the page within memory, and the like, as well as various combinations thereof).

For example, in embodiments in which method 200 is being executed at a source copy device, the electronic representation of the page may be received/retrieved/accessed by processor $111_S$ from scanner $112_S$ and/or memory $113_S$.

For example, in embodiments in which method 200 is being executed at a destination copy device, the electronic representation of the page may be received/retrieved/accessed by processor $111_D$ from memory $113_D$ and/or communication interface 116. For example, the electronic representation of the page is initially received via CN 120, and may then be provided directly to processor $111_D$ for processing, provided to memory $113_D$ for storage and then to processor $111_D$ for processing, and the like. In this sense, on a destination copy device, the electronic representation of the page may be considered to be received locally (e.g., from memory $113_D$) or remotely (e.g., from SCD $110_S$ via CN 120).

The electronic representation of the page may be represented in any suitable format. In one embodiment, the electronic representation of the page includes information associated with each of a plurality of pixels of the page. The pixel information of a pixel of a page includes any information suitable for reproducing that pixel of the page. In one embodiment, for example, the pixel information of a pixel includes contrast information indicative of the contrast of that pixel of that page of the document. For example, for black and white pages, each pixel may be represented using a single bit (e.g., "0" for white and "1" for black; or vice versa). Similarly, for example, for grayscale and color pages, each pixel may be presented using multiple bits, where different combinations of bit values represent different shades and/or colors. The electronic representation of the page may be represented in any other suitable format. The electronic representation of a page of a document will be understood by one skilled in the art.

At step 206, the electronic representation of the page is processed for determining whether the page is misaligned.

The electronic representation of the page may be processed in any manner suitable for determining whether the page is misaligned.

In one embodiment, processing of the electronic representation of a page for determining whether the page is misaligned includes processing the electronic representation of the page for determining whether the page is blank or substantially blank. As described herein, detection of a page as being blank or substantially blank may indicate, among other things, that the page is inverted (e.g., the side of the page including content was placed face down when it should have been placed face up or vice versa, such as when a page is inverted when being copied or faxed).

In one embodiment, processing of the electronic representation of a page for determining whether the page is blank or substantially blank is performed using contrast information associated with pixels of the page. For example, the contrast information of the page may include the absolute contrast of the pixels of the page, variations in the contrast of the pixels of the page, and/or other suitable contrast information, as well as any suitable combinations thereof.

In one embodiment, as indicated herein, the contrast information of the page that is processed to determine whether or not the page is blank or substantially blank includes the absolute contrast of the pixels of the page. The absolute contrast information associated with pixels of the page may be processed in any suitable manner for determining whether or not the page is blank or substantially blank. In one embodiment, for example, processing the electronic representation of the page for determining whether the page is blank or substantially blank includes determining whether one or more absolute contrast values associated with the pixels of the page have a particular value. In one embodiment, for example, processing the electronic representation of the page for determining whether the page is blank or substantially blank includes determining whether one or more absolute contrast values associated with the pixels of the page satisfy a threshold. The use of absolute contrast, rather than variations in contrast, enables detection of blank pages that are on white paper. However, use of absolute contrast may fail to detect blank pages that are printed on colored paper, lined paper, and other types of paper having underlying color and/or markings, because the color/markings of the underlying sheets will most likely be detected as contrast and, thus, even if the page is devoid of any useful information (or even any markings whatsoever, as may be the case with colored paper) the detection of contrast results in a determination that the page is not blank or even substantially blank. Thus, the use of absolute contrast may be employed where colored pages, lined paper, and the like are not expected to be used.

In one embodiment, as indicated herein, the contrast information of the page that is processed to determine whether or not the page is blank or substantially blank includes variations in contrast of the pixels of the page. The variations in contrast associated with the pixels of the page may be processed in any suitable manner for determining whether or not the page is blank or substantially blank. In one embodiment, for example, processing the electronic representation of the page for determining whether the page is blank or substantially blank includes determining whether variations in contrast between pixels of the page satisfy a threshold (e.g., variations below a threshold indicate that the page is identified as being blank or substantially blank while variations above a threshold indicate that the page is not identified as being blank or substantially blank). The use of variations in contrast, rather than absolute contrast, enables detection of blank pages where the blank pages are devoid of any useful information, but where the pages may have some characteristics that would otherwise be likely to cause a failure of blank page detection when absolute contrast of the pixels is processed (e.g., when the page is printed on colored paper, when the page is printed on lined paper, when the photograph of the page was taken at night or with the lens cover on such that all or most of the photograph is black, and the like).

Although primarily described with respect to embodiments in which either absolute contrast or variation in contrast is used for detecting blank or substantially blank pages, in some embodiments a combination of such contrast information may be used for detecting blank or substantially blank pages.

Although primarily described with respect to embodiments in which either absolute contrast or variation in contrast is used for detecting blank or substantially blank pages, in some embodiments detection of contrast patterns (or lack thereof) may be used for detecting blank or substantially blank pages. In some such embodiments, the detection of such contrast patterns may utilize detection of variations in contrast for detecting the contrast patterns which ultimately determine whether the pages are identified as being blank or substantially blank.

In one embodiment, processing of the electronic representation of a page for determining whether the page is misaligned includes processing the electronic representation of the page for determining whether the page is oriented in an unusable or undesirable manner.

In one embodiment, the detection of a page as being oriented in an unusable or undesirable manner may be performed using one or more of pattern recognition techniques (e.g., using contrast information associated with the page), optical character recognition (OCR) techniques, and the like, as well as various combinations thereof.

In one embodiment, the detection of a page as being oriented in an unusable or undesirable manner may be performed using pattern recognition techniques.

In one such embodiment, for example, a page may be detected as being oriented in an unusable or undesirable manner in response to detection of a certain pattern of contrast changes on the page. For example, a page may be detected as being oriented in an unusable or undesirable manner where the text of the page is expected to be aligned with one axis of the page (e.g., left-right), but the text of the page is detected as not being aligned with the expected axis of the page (e.g., the text is aligned top-bottom or along some other axis therebetween). In this example, where the text of the page is expected to be aligned with the left-right axis of the page, it will be expected that as processing proceeds from the top of the page toward the bottom of the page, there will be, across the left-right axis of the page, interleaving of (1) lines in which there is contrast along significant portions of the line and (2) lines in which there is no contrast along the lines. In this example, if contrast is detected on all (or at least most) of the lines as processing proceeds from the top of the page toward the bottom of the page, this pattern will be indicative that the page is misaligned (e.g., rotated by 90%, or by some other angle, in either direction). In general, this embodiment enables detection of incorrectly oriented pages that have been incorrectly oriented in nearly any manner; however, depending upon the manner in which this embodiment is implemented, there may be cases in which this embodiment does not detect an upside down page (e.g., such as where, although the words are upside down because the orientation of the words on the page is rotated by 180% from the expected orientation of the content on the page, the contrast patterns are substantially similar to contrast patterns of a properly oriented page, such that the page is not detected as being incorrectly oriented). It will be appreciated that the expected orientation of the page in this example is merely exemplary and, thus, that various other orientations of the content of a page may be expected/desirable. It will be appreciated that the described order of processing of a page in this example also is merely exemplary and, thus, that the processing of pages for detecting certain patterns of contrast changes on the page may be performed in any suitable order.

In one embodiment, for example, a page may be detected as being oriented in an unusable or undesirable manner using OCR techniques. In one such embodiment, for example, a page may be detected as being misaligned in response to a determination that the OCR process fails to recognize characters on the page (e.g., fails to recognize any characters, recognizes some characters but fails to recognize at least a threshold number of characters, and the like, as well as various combinations thereof). This embodiment enables detection of misaligned pages that have been misaligned in any manner (e.g., rotated by some angle in either direction, inverted by 180%, and the like).

Although primarily depicted and described herein with respect to embodiments in which specific types of information/processing are used for determining whether a page is misaligned (e.g., contrast information, contrast pattern recognition techniques, OCR techniques, and the like, as well as various combinations thereof), in at least some embodiments other types of information and/or processing may be used for detecting misaligned pages. Accordingly, one such more general embodiment is depicted and described with respect to FIG. 3.

At step 208, a determination is made as to whether the selected page of the document is determined to be misaligned. If the selected page is determined not to be misaligned, method 200 proceeds to step 210. If the selected page is determined to be misaligned, method 200 proceeds to step 212.

At step 210, a determination is made as to whether the final page of the document has been selected and processed. If the final page of the document has not been selected and processed, method 200 returns to step 204, at which point the next page of the document is selected for processing and method 200 continues. If the final page of the document has been selected and processed, method 200 proceeds to step 216, at which point method 200 ends.

At step 212, an alarm is generated and presented.

The alarm may be generated in any suitable format. In one embodiment, for example, the alarm may be generated as one or more control signals which are adapted for use in triggering presentation of the alarm. In one embodiment, for example, the alarm may be generated as one or more control messages which are adapted for use in triggering presentation of the alarm (and which may include additional status information associated with the detection of the misaligned page, such as for use in presenting more detailed misaligned page detection information). The alarm may be generated in any other suitable format.

The alarm is generated by the copy device on which the misaligned page is detected. The alarm may be presented by the copy device on which the misaligned page is detected, remote to the copy device on which the misaligned page is detected, and the like, as well as various combinations thereof. In this manner, the copy device on which the misaligned page is detected generates an alarm for presentation locally at the copy device and/or for propagation to a remote device or devices for presentation.

The alarm may be presented in any suitable manner (e.g., via any suitable presentation means, in any suitable format, and the like, as well as various combinations thereof).

In one embodiment, for example, where the alarm is presented by the copy device, the alarm may be presented using any suitable means by which the copy device may present the alarm. In one such embodiment, for example, the alarm may be presented using the alert module and/or the user interface of the copy device. The alarm may be an audible alarm, a visual alarm, and the like, as well as various combinations thereof.

In one embodiment, for example, in which the alarm is an audible alarm, the audible alarm may be presented using any suitable audible alarms. For example, an audible alarm may be presented using one or more beeps or other suitable sounds, a spoken message, sound generated through vibration, and the like, as well as various combinations thereof.

In one embodiment, for example, in which the alarm is a visual alarm, the visual alarm may be presented using any suitable visual means. In one embodiment, for example, a visual alarm may be presented by lighting one or more lights on the copy device, causing one or more lights on the copy device to flash, and the like, as well as various combinations thereof. In one embodiment, for example, a visual alarm may be presented by displaying an alarm message on a display of the copy device, such as on an LED display of the copy device, (e.g., LED display of a fax machine, photocopier, scanner, or other copy device having an LED display), on a graphical user interface (GUI) available on a display of the copy device (e.g., GUI display of a photocopier, computer, cell phone, or other copy device supporting a GUI), and the like, as well as various combinations thereof. In one embodiment, for example, a visual alarm may be presented by printing one or more messages using the copy device (e.g., by printing an indication of the detection of the misaligned page on the transmission status sheet typically printed by a source fax machine upon completion of transmission of an associated fax, by printing an indication of the detection of the misaligned page on a status sheet printed by a destination fax machine upon receiving and printing the associated fax, by printing an indication of the detection of the misaligned page on a status sheet printed by a photocopier following printing of the document being copied, and the like). It will be appreciated that any other suitable types of visual display means and associated visual displays may be used for presenting a visual alarm.

It will be appreciated that presentation of misaligned page alarms by the copy device may be implemented in any other suitable manner.

In one embodiment, for example, where the alarm is presented remote from the copy device, the alarm may be propagated from the copy device to one or more other devices on which the alarm may be presented to a user. For example, a message indicative of the detection of the misaligned page may be communicated to a computer, phone, or other device of one or more users (e.g., via a phone call, an email, an SMS message, an MMS message, an IM, and the like, as well as various combinations thereof). The alarm may be delivered to any suitable user(s), such as the user sending or receiving the document, a user or users configured to receive the alarm regardless of the user or users sending or receiving the document, and the like, as well as various combinations thereof. For example, in a home environment, the user may configure the copy device to alert the user to detection of a misaligned page(s) of a document via an email, an SMS message, an MMS message, an IM, or any other suitable means. For example, in an office environment, the office may appoint one or more people as the user(s) to receive notifications when misaligned pages are detected (e.g., by configuring the copy device to alert the user to detection of a misaligned page(s) of a document via a phone call, an email, an SMS message, an MMS message, an IM, or any other suitable type of messaging). It will be appreciated that remote presentation of misaligned document alarms may be implemented in any other suitable manner.

In one embodiment, the alarm may include associated status information. In one such embodiment, for example, the alarm may include information indicative of the page number (s) of the pages(s) detected as being misaligned. The alarm may include any other suitable status information.

It will be appreciated that the manner in which the alarm is presented may depend on the type of copy device on which the misaligned page is detected.

It will be appreciated that any alarm or combination of alarms suitable for indicating detection of a misaligned page of a document may be used. The misaligned page detection and response capability is not intended to be limited to any particular type of alarm but, rather, encompasses any and all types and/or combinations of alarms suitable for such purposes.

At step 214 (an optional step), one or more control actions may be initiated.

In one embodiment, one of the control actions includes providing a user with an option to continue with copying of the document or to abort copying of the document, which may be provided while copying of the document continues or is temporarily suspended. In one embodiment, one of the control actions includes temporarily suspending copying of the document. In one embodiment, the copying of the document can be temporarily suspended until receiving an instruction from a user (e.g., an instruction as to whether to continue with copying of the document (e.g., where presence of the misaligned page does not matter, where the misaligned page is a blank page that is intentionally used as a separator within the document, and the like) or to abort copying of the document (e.g., so as to prevent any further copying of the document so that the copying of the document without the misaligned page(s) can be re-initiated)). In one embodiment, the copying of the document can be temporarily suspended until receiving an instruction from a user or until the expiration of a timer (at which time copying of the document may be automatically continued or aborted). In one embodiment, in which this control action is provided on a source copy device and the copying of the document continues, the option may be provided to the user during one or more of scanning of the document, generation of an electronic representation of the document, transmission of the document, printing of the document, and the like, as well as various combinations thereof. In one embodiment, in which this control action is provided on a source copy device, an associated control action includes automatically stopping an automatic document feeder of the copy device, so as to prevent further loading of a document that may need to be reloaded after any undesired misaligned pages are corrected (e.g., automatic document feeder may be stopped permanently for the current copy job, or temporarily for the current copy job so as to provide a user with an option to continue with the copy job and, thus, to allow time for the user to indicate whether or not he or she wishes to continue with the copy job). In one embodiment, in which this control action is provided on a destination copy device and the copying of the document continues, the option may be provided to the user during one or more of reception of an electronic representation of the document, processing of the electronic representation of the document, printing/display of the document, and the like, as well as various combinations thereof. It will be appreciated that the option may be presented in any suitable manner and, similarly, the option selected by the user may be entered by the user in any suitable manner (e.g., pressing a button on a control panel of a fax machine; using a mouse, keyboard, touch screen and/or other selecting means to indicate selection of the option via a display; and the like; as well as various combinations thereof). It will be appreciated that various other associated control actions may be initiated in place of or in addition to the control actions described herein.

In one embodiment, one of the control actions includes transmitting, from a first copy device, on which a misaligned page is detected, to a second copy device, a warning message indicating detection of the misaligned page on the first copy device.

In this embodiment, where the first copy device is the source copy device and the second copy device is the destination copy device, the warning message is transmitted from the source copy device to the destination copy device. The warning may be transmitted in any suitable manner. For example, in the case of two fax machines, the source fax machine may fax to the destination fax machine an additional sheet (e.g., as part of the current fax session between the fax machines, by initiating a new fax session between the fax machines, and the like) including a message indicative that the source fax machine has detected that the fax that it just sent includes at least one misaligned page that may need to be resent. It will be appreciated that any other suitable warning message may be used.

In this embodiment, where the first copy device is the destination copy device and the second copy device is the source copy device, the warning message is transmitted from the destination copy device to the source copy device. The warning may be transmitted in any suitable manner. For example, in the case of two fax machines, the destination fax machine may initiate a fax session with the source fax machine and, upon establishment of the session, fax to the source fax machine sheet including a message indicative that the destination fax machine has detected that the fax that it just received includes at least one misaligned page that may need to be resent. It will be appreciated that any other suitable warning message may be used.

In one embodiment, one of the control actions includes correcting the alignment of the misaligned page.

In one such embodiment, in which the misaligned page is inverted (e.g., such as where the two sides of the page were aligned incorrectly with respect to the function being performed, such as where a page is placed face down on a fax machine when it should be placed face up, where a page is placed face up on a copy machine when it should be placed face down, and the like), the opposite side of the page (i.e., the side of the page opposite the side of the page that was processed when the misaligned page was detected) may be examined for determining whether the opposite side of the page is blank or substantially blank. The examination of the opposite side of the page for determining whether the opposite side of the page is blank or substantially blank may be performed in any suitable manner (e.g., using a capability for detecting blank or substantially blank pages as depicted and described herein, using another capability suitable for use in detecting a blank or substantially blank page, and the like). In this embodiment, since the page is inverted, the examination of the opposite side of the page results in a determination that the opposite side of the page includes content. In this embodiment, correction of the inverted page may be performed in any suitable manner (e.g., such as by capturing the content from the opposite side of the page and using the captured content in place of the side of the page detected as being blank or substantially blank). This may be performed such that the resulting page (i.e., the page that is actually transmitted, stored, displayed, and the like) is the correct version of the page, rather than the blank page that would otherwise result. In such embodiments, an associated alarm may or may not be raised. It will be appreciated that such embodiments may be implemented at least in any copy device that supports dual-side copy capabilities.

In one such embodiment, in which the misaligned page is oriented in an unusable or undesirable manner (e.g., such as where the misaligned page is rotated by some angle within its plane with respect to the orientation of the other pages and/or where the content of the page is rotated by some angle with respect to the necessary or preferred orientation of the content on the page), correction of the alignment of the misaligned page may be performed in any suitable manner. In one embodiment, for example, where the misaligned page is rotated by some angle within its plane with respect to the orientation of the other pages (e.g., such as where the misaligned page is upside down with respect to other pages), the orientation of the misaligned page may be corrected by rotating the misaligned page such that the orientation of the misaligned page conforms to the orientation of the other pages. In one embodiment, for example, where the content of the page is rotated by some angle with respect to the necessary or preferred orientation of the content on the page the orientation of the misaligned page may be corrected by modifying the alignment of the content on the misaligned page. This may be performed such that the resulting page (i.e., the page that is actually transmitted, stored, displayed, and the like) is the correct version of the page, rather than the misaligned page that would otherwise result. In such embodiments, an associated alarm may or may not be raised. It will be appreciated that such embodiments may be implemented at least in any suitable copy device.

It will be appreciated that other types of misalignments may be corrected.

It will be further appreciated that misalignment of pages may be corrected in any other suitable manner.

In one embodiment, one of the control actions includes examining the opposite side of the page (i.e., the side of the page opposite the side of the page that was processed when the misaligned page was detected) for determining whether the whether the opposite side of the page is blank or substantially blank. In one such embodiment, examination of the opposite side of the page may be performed by a capability for detecting blank or substantially blank pages, as depicted and described herein. In another such embodiment, examination of the opposite side of the page may be performed using another capability suitable for use in detecting a blank or substantially blank page. This will be useful in cases in which the page is inverted (e.g., such as where the two sides of the page were aligned incorrectly with respect to the function being performed, such as where a page is placed face down on a fax machine when it should be placed face up, where a page is placed face up on a copy machine when it should be placed face down, and the like), but where it is not immediately apparent as to whether the page is an inverted page or simply a page that is blank or substantially blank. In one further embodiment, where examination of the opposite side of the page results a determination that the opposite side of the page includes content (i.e., the page was inverted), one or more additional control actions may be initiated. In one embodiment, for example, an additional control action includes correcting the alignment of the misaligned page (e.g., such as by capturing the content from the opposite side of the page and using the captured content in place of the side of the page detected as being blank or substantially blank). This may be performed such that the resulting page (i.e., the page that is actually transmitted, stored, displayed, and the like) is the correct version of the page, rather than the blank page that would otherwise result. In such embodiments, an associated alarm may or may not be raised. The additional control action(s) may include any other suitable control actions. It will be appreciated that such embodiments may be implemented at least in any copy device that supports dual-side copy capabilities.

It will be appreciated that any other suitable control action(s) may be performed.

At step 216, method 200 ends.

As described herein, the method 200 of FIG. 2 may be performed in conjunction with processing associated with the copy function that is being performed for the document by the copy device (e.g., scanning of a document at a source copy device for transmission toward a destination copy device, processing of an electronic representation of a document at a copy device for storage and/or presentation of the document at the copy device, and the like) and/or independent of the processing associated with the copy function that is being performed for the document by the copy device. Accordingly, in various embodiments, method 200 may be integrated with one or more other methods which may be invoked on the copy device (e.g., for providing copy functions) and/or may be provided as a standalone method which may be invoked serially and/or in parallel with one or more other methods which may be invoked on the copy device. As such, although primarily depicted and described herein as ending (for purposes of clarity), it will be appreciated that other functions may be invoked and/or may continue to be performed on the copy device (e.g., one or more of processing associated with the copy function being performed for the document, processing associated with detection of misaligned pages of the document, and the like).

Although primarily depicted and described herein with respect to an embodiment in which method 200 ends upon detection of the first misaligned page of the document and generation and presentation of the associated alarm, in at least one other embodiment processing of the electronic representation of the document may continue until all of the pages of the document have been processed for purposes of detecting misaligned pages of the document. The continuation of processing may be performed in any suitable manner.

In one embodiment, an alarm is generated and presented upon detection of the first misaligned page of the document, but processing of the electronic representation of the document for determining whether any other page(s) of the document is misaligned continues. In one such embodiment, method 200 may be modified such that, rather than proceeding from step 212 to step 216 (directly, or via step 214), method 200 may proceed from step 212 (or step 214, depending on whether a control action is required on a per-page basis) to step 210, such that processing of the document may continue until all pages of the document have been processed. In this case, an alarm has been generated and presented upon detection of the first misaligned page of the document, but processing of the document continues (e.g., any other pages of the document continue to be processed). In one such embodiment, the copy device may maintain a list of each page of the document detected as being misaligned such that, upon completion of processing of each of the pages of the document (e.g., a YES determination at step 210), the alarm that was generated and presented may be supplemented with, modified to include, or otherwise replaced by additional status information (e.g., a listing of the page number(s) of the page(s) identified as being misaligned).

In one embodiment, all pages of the document are processed before a determination is made as to whether or not an alarm is to be generated and presented for the document. In one such embodiment, method 200 may be modified such that, rather than proceeding from step 208 to step 210, method 200 may proceed from step 208 to another step (not depicted), at which point an indication that the page was identified as being misaligned is stored. In this manner, the copy device can keep track of which, if any, of the pages of the document were identified as being misaligned. From this other step, method 200 may then proceed to step 210 and processing will continue in the manner described with respect to FIG. 2. In this embodiment, following completion of processing of all pages of the document (e.g., a YES determination at step 210), method 200 does not proceed from step 210 to step 216; rather, method 200 proceeds from step 210 to another step (not depicted) at which point a determination is made as to whether any pages of the document were detected as being misaligned (i.e., a determination as to whether or not an alarm should be generated and presented for the document). In this case, if an alarm should be presented, method 200 performs step 212 and, optionally, step 214, and then proceeds to step 216 where method 200 ends. In this case, if an alarm should not be presented, method 200 proceeds directly to step 216, where method 200 ends. It will be appreciated that in such an embodiment, generation and presentation of the alarm is not performed until the entire document has been processed. This may be useful in many situations, such as where additional status information associated with detection of misaligned pages is provided. For example, this may be useful where the alarm indicating detection of a misaligned k page(s) includes a listing of the page number(s) of the page(s) identified as being misaligned.

In foregoing embodiments depicted in or otherwise associated with method 200 of FIG. 2, it will be appreciated that, as described herein, it may or may not be desirable for processing of the document to continue after detection of a misaligned page. This processing may include processing of the document that is associated with the copy function being performed by the copy device, at least because initiation of one or more of the optional control actions may result in a temporary or permanent suspension of the copy function being performed (e.g., temporarily suspending the copy function pending an indication from the user that the copy function may continue in spite of detection of a misaligned page; aborting the copy function so as to prevent copying, storage, transmission, receipt and the like of a document that will need to be re-copied; and the like). For example, it may be desirable for such processing to continue where only one page of a document having multiple pages is detected as being misaligned and that single page can be recopied by itself. For example, it may be desirable for such processing to be temporarily suspended until the user can decide whether or not processing should continue or be aborted (e.g., if the user determines that only a single page of a large document was inverted, the user may elect to continue with the copy function and then re-copy the single page; if the user determines that the entire document was upside down such that the entire document will need to be re-copied, the user may abort the copy function; and the like). This processing also or alternatively may include processing of the pages of the document for detecting misaligned pages of the document.

Although primarily depicted and described herein with respect to embodiments in which processing of a document for detecting any misaligned pages of the document is performed serially on a page-by-page basis, it will be appreciated that such processing of the document may be performed in any other suitable manner. In one embodiment, for example, the document may be processed by processing groups of pages serially and/or in parallel. In one embodiment, for example, the document may be processed as a whole. It will be appreciated that any other suitable method may be used.

As described herein, in at least some embodiments of the misaligned page detection and response capability, the detection of a misaligned page of a document is performed by processing contrast information of an electronic representation of the document. In at least some embodiments, however, other methods of detecting a misaligned page of a document may be used.

As described herein, in at least some embodiments of the misaligned page detection and response capability, one or more control actions in addition to and/or in place of alarm presentation may be initiated in response to detection of the misaligned page of the document.

Figure 3:
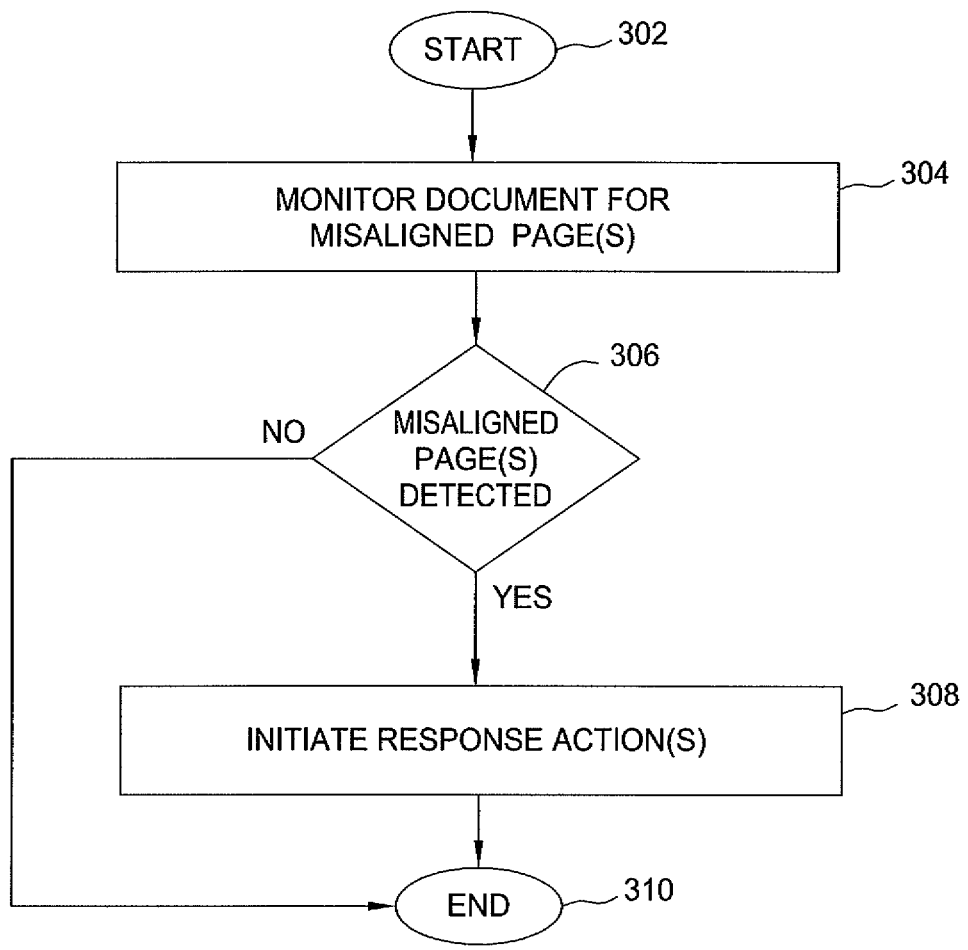
FIG. 3 depicts one embodiment of a method for detecting a misaligned page of a document and responding to detection of a misaligned page of a document.

Accordingly, in view of such potential embodiments, the method 200 of FIG. 2 may be generalized in the manner depicted and described with respect to FIG. 3, as description of which follows.

FIG. 3 depicts one embodiment of a method for detecting a misaligned page of a document and responding to detection of a misaligned page of a document. The method 300 of FIG. 3 may be performed by a source copy device or a destination copy device, with some differences that will be understood by way of reference to FIG. 2.

At step 302, method 300 begins.

At step 304, a document is monitored for misaligned pages. The monitoring of a document for determining whether the document includes any misaligned pages may be performed in any suitable manner (e.g., by processing an electronic representation of the document in a manner depicted and described with respect to FIG. 2 or using any other suitable method).

At step 306, a determination is made as to whether at least one page of the document is determined to be misaligned. If no pages of the document are determined to be misaligned, method 300 proceeds to step 310 where method 300 ends. If one or more pages of the document are determined to be misaligned, method 300 proceeds to step 308.

At step 308, a response action(s) is initiated. The response action(s) may include one or more of generation and presentation of an alarm, automatic correction of alignment of the page, and the like, as well as various combinations thereof. The response actions may include any such actions depicted and described herein.

At step 310, method 300 ends.

Although primarily depicted and described herein with respect to embodiments in which a control signal adapted for use in triggering presentation of an alarm is generated in response to a determination that a single page of a document is misaligned, in at least one other embodiment a control signal adapted for use in triggering presentation of an alarm may not be generated in response to a determination that a single page of a document is misaligned. In one embodiment, for example, such a control signal will only be generated in response to a determination that a threshold number or threshold percentage of pages of the document have been identified as being misaligned. In one embodiment, for example, such a control signal is only generated in response to a determination that all pages of the document have been identified as being misaligned (e.g., only in the case in which an inverted document, such as one placed upside down during copying, has been detected). It will be appreciated that other similar embodiments may be supported.

Although primarily depicted and described herein with respect to single-sided processing embodiments in which processing of the pages of a document is performed on a single side of each of the pages of the document, one or more dual-sided processing embodiments, in which the processing of one or more of the pages of a document may be performed on both sides of the page(s) of the document, may be provided.

In such dual-sided processing embodiments, both sides of one or more pages of a document may be processed for performing various functions.

In one embodiment, processing of both sides of one or more of the pages of a document may be initiated automatically.

In one embodiment, processing of both sides of one or more pages of the document may be initiated in response to one or more trigger conditions (e.g., in response to detection of a condition on one side of a page of a document that triggers processing on the opposite side of that page of the document and/or on the opposite side(s) of some or all of the other pages of the document, in response to selection of certain functions or options on the copy device, based on the source and/or intended destination of a copy of the document, and the like, as well as various combinations thereof).

In one dual-sided processing embodiment, for each page of a document, both sides of the page are processed for determining whether or not the respective sides of the page include content. In one such embodiment, for example, for each page of the document, each side of the page may be processed using techniques described herein for use in detecting a blank or substantially blank page (e.g., using absolute contrast, variations in contrast, and the like, as well as various combinations thereof). In this embodiment, during processing of a side of a page, failure to detect that the side of a page is blank or substantially blank results in a determination that the page includes content.

This will be useful, for example, where a user is copying a double-sided document, but selects a standard 1-sided to 1-sided document copy option that would result in only half of the pages of the document being copied (e.g., such as where the user isn't aware that the document is double-sided, the user selects the wrong document copy options, or for any other reason). In this case, detection that both sides of at least some of the pages of the document include content while the 1-sided to 1-sided document copy option is selected may result in one or more of generation and presentation of an associated alarm, automatically switching from selection of the 1-sided to 1-sided document copy option to the 2-sided to 2-sided document copy option, providing a user with an option to manually switch from selection of the 1-sided to 1-sided document copy option to the 2-sided to 2-sided document copy option, and the like, as well as various combinations thereof.

This also will be useful, for example, where a user is copying a single-sided document, but selects a 2-sided to 2-sided document copy option that would result in both sides of the pages of the document being copied even though only one side of each page of the document actually includes content (e.g., such as where the user isn't aware that the document is single-sided, the user selects the wrong document copy options, or for any other reason). In this case, detection that only one side of each of the pages of the document includes content while the 2-sided to 2-sided document copy option is selected may result in one or more of generation and presentation of an associated alarm, automatically switching from selection of the 2-sided to 2-sided document copy option to the 1-sided to 1-sided document copy option, providing a user with an option to manually switch from selection of the 2-sided to 2-sided document copy option to the 1-sided to 1-sided document copy option, and the like, as well as various combinations thereof.

It will be appreciated that this dual-sided processing embodiment will be useful in various other scenarios and, thus, that use of such embodiments is not limited to or by the above-described examples.

It will be appreciated that, although primarily described with respect to copying of documents using photocopy machines, this dual-sided processing embodiment also may be used within the context of any other suitable copy functions and/or other similar functions as depicted and described herein (e.g., during faxing of a document, emailing of a document, receipt of a document at a user device, receipt of a document at a network storage device, and the like, as well as various combinations thereof).

In one dual-sided processing embodiment, depicted and described herein as being a possible control action which may be initiated in response to detection of a blank or substantially blank page, in response to detecting that one side of a page is blank or substantially blank the opposite side of the page may be examined for determining whether the opposite side of the page is blank or substantially blank. In one such embodiment, examination of the opposite side of the page may be performed by a capability for detecting blank or substantially blank pages, as depicted and described herein. In another such embodiment, examination of the opposite side of the page may be performed using another capability suitable for use in detecting a blank or substantially blank page. This will be useful in cases in which the page is inverted (e.g., such as where the two sides of the page were aligned incorrectly with respect to the function being performed, such as where a page is placed face down on a fax machine when it should be placed face up, where a page is placed face up on a copy machine when it should be placed face down, and the like). In one further embodiment, where examination of the opposite side of the page results a determination that the opposite side of the page includes content (i.e., the page was inverted), one or more additional control actions may be initiated. In one embodiment, for example, an additional control action includes capturing the content from the opposite side of the page and using the captured content in place of the side of the page detected as being blank or substantially blank. This may be performed such that the resulting page (i.e., the page that is actually printed, stored, transmitted, displayed, and the like) is the correct version of the page, rather than the blank page that would otherwise result. In such embodiments, an associated alarm may or may not be raised. The additional control action(s) may include any other suitable control actions.

Although primarily depicted and described herein with respect to embodiments in which both the source copy device and destination copy device support the misaligned page detection and response capability, it will be appreciated that the various benefits of the misaligned page detection and response capability may still be realized where only the source copy device supports the misaligned page detection and response capability or only the destination copy device supports the misaligned page detection and response capability.

Although primarily depicted and described herein with respect to embodiments in which the misaligned page detection and response capability is used in a networked environment, it will be appreciated that the misaligned page detection and response capability also may be used in non-network environments. For example, the misaligned page detection and response capability may be used for detecting misaligned pages on a photocopy copy machine when a user is making hard copies of an original document not intended for transmission to a copy destination device. For example, the misaligned page detection and response capability may be used for detecting misaligned pages on a printer, scanner, or other peripheral that is directly wired to a computer of a user.

Although primarily depicted and described herein with respect to embodiments in which the misaligned page detection and response capability is provided in devices using image processing capabilities (e.g., devices that generate image-based copies of documents using scanning capabilities and/or render image-based copies of documents using image rendering capabilities), it will be appreciated that the misaligned page detection and response capability also may be used in devices that using OCR or any other capabilities suitable for use in handling copies of documents.

Although primarily depicted and described herein with respect to use of the misaligned page detection and response capability for processing electronic representations of documents for purposes of detecting misaligned pages of documents, the misaligned page detection and response capability may be used for processing any electronic representation of information for detecting defined portions of the information which are misaligned.

Although primarily depicted and described herein with respect to embodiments in which detection of a misaligned page results in generation and presentation of an alarm and the initiation of any associated control action(s) is optional, in at least some embodiments, one or more control actions may be initiated in response to detection of a misaligned page while generation and presentation of an associated alarm may be optional. This may be utilized for any of the embodiments described herein where such an arrangement is suitable, such as where an automatic correction action is taken in response to detecting a misaligned page(s) (e.g., where one or more pages that are upside down with respect to the alignment of other pages are automatically rotated by 180 degrees such that they are automatically realigned with the other pages, where one or more pages that are inverted are automatically processed such that the content appears on the correct side of all pages, and the like).

Although primarily depicted and described herein with respect to embodiments in which processing is performed for detecting that a page is misaligned, in other embodiments processing may be performed for detecting that a page is blank or substantially blank. While detection of a blank or substantially blank page may indicate that the page is misaligned in some manner, there are situations in which detection of a page as being blank or substantially blank does not necessarily indicate misalignment of the page. For example, a blank page may be inadvertently included within a document. In this example, the page is not misaligned; rather, the page is extraneous. Accordingly, one or more embodiments may be provided for detecting a blank or substantially blank page. In one such embodiment, for example, a method includes processing an electronic representation of a page of a document for determining whether the page is blank or substantially blank, and when a determination is made that the page is blank or substantially blank, generating a control signal adapted for use in triggering presentation of an alarm indicating that the page is blank or substantially blank. In one such embodiment, for example, a method includes, in response to detecting that at least one page of a document is blank or substantially blank, initiating an action for the blank or substantially blank page (e.g., one or more of removing the blank or substantially blank page from the document, determining whether detection of the blank or substantially blank page indicates misalignment of the page, triggering generation and presentation of one or more alarms, and the like, as well as various combinations thereof). It will be appreciated that at least some such embodiments may be provided by adapting any of the embodiments depicted and described herein with respect to the misaligned page detection and response capability.

Figure 4:
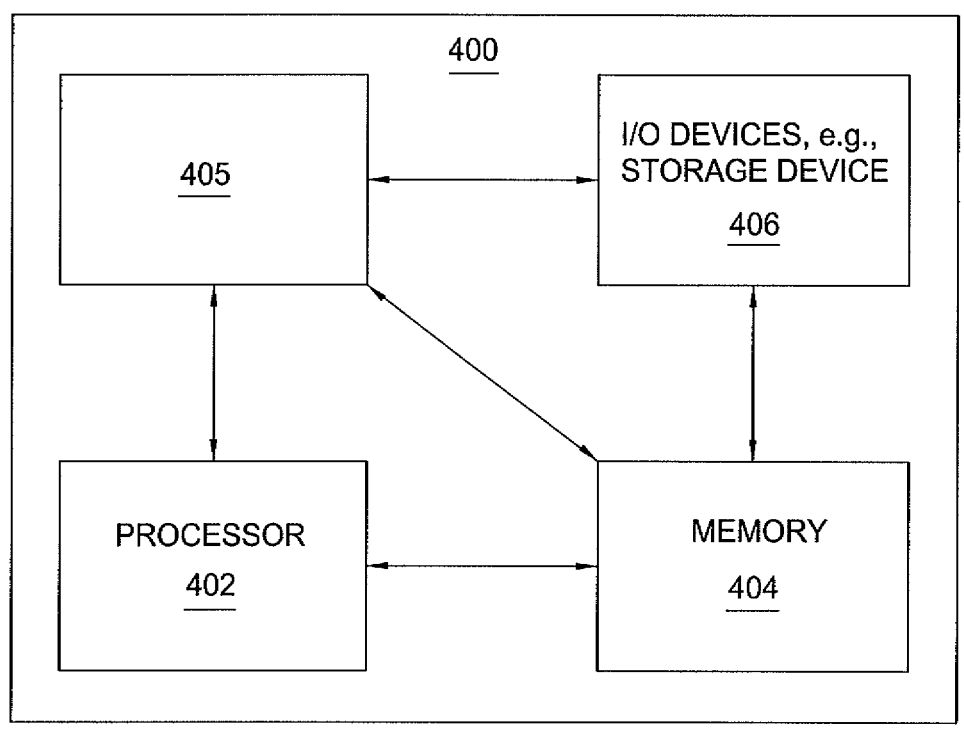
FIG. 4 depicts a high-level block diagram of a computer suitable for use in performing the functions described herein.

FIG. 4 depicts a high-level block diagram of a computer suitable for use in performing the functions described herein. As depicted in FIG. 4, computer 400 includes a processor element 402 (e.g., a central processing unit (CPU) and/or other suitable processor(s)), a memory 404 (e.g., random access memory (RAM), read only memory (ROM), and the like), a misaligned page detection and response module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software, hardware, and/or a combination of software and hardware, e.g., using a general purpose computer, one or more application specific integrated circuits (ASIC), and/or any other equivalents. In one embodiment, misaligned page detection and response process 405 can be loaded into memory 404 and executed by processor 402 to implement the functions as discussed herein. As such, misaligned page detection and response process 405 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method, comprising:
   processing an electronic representation of a page of a document for determining whether the page is misaligned;
   when a determination is made that the page is misaligned, generating a control signal adapted for use in triggering presentation of an alarm indicating that the page is misaligned; and
   performing at least one control action when a determination is made that the page is misaligned, wherein the at least one control action comprises at least one of:
      when the document is intended for transmission via a network, providing a user with an option to continue with transmission of the document or to abort transmission of at least a portion of the document;
      when the determination that the page of the document is misaligned is made while at least one page of the document is still being input via an automatic document feeder, automatically stopping the automatic document feeder; and
      automatically correcting the alignment of the misaligned page.

2. The method of claim a 1, wherein the electronic representation of the page is received locally from a memory.

3. The method of claim 1, wherein the method is performed by a copy device, wherein the electronic representation of the page is generated by the copy device.

4. The method of claim 1, wherein the method is performed by a first copy device, wherein the electronic representation of the page is received at the first copy device from a second copy device via a communication path.

5. The method of claim 1, wherein the electronic representation of the page comprises contrast information for each of a plurality of pixels of the page.

6. The method of claim 5, wherein processing the electronic representation of the page comprises:
   processing the contrast information of at least a portion of the pixels of the page for determining whether the page is misaligned.

7. The method of claim 5, wherein processing the electronic representation of the page for determining whether the page is misaligned comprises:

determining whether absolute contrast values associated with the pixels of the page satisfy a value or a threshold.

8. The method of claim 5, wherein processing the electronic representation of the page for determining whether the page is misaligned comprises:

determining whether a variation in contrast between the pixels of the page satisfies a threshold.

9. The method of claim 5, wherein processing the electronic representation of the page for determining whether the page is misaligned comprises:

identifying a contrast pattern indicative that the page is misaligned.

10. The method of claim 1, wherein the control signal is generated on a copy device, wherein the alarm is presented using the copy device.

11. The method of claim 1, wherein the alarm comprises at least one of an audible alarm and a visual alarm.

12. The method of claim 1, wherein the electronic representation of the page is received at a destination copy device from a source copy device, further comprising:

propagating, from the destination copy device toward the source copy device in response to the control signal, a message indicative of detection of the misaligned page.

13. The method of claim 1, wherein the method is performed by a copy device comprising at least one of a fax capability, a photocopy capability, a scan capability, a print capability, and a display capability.

14. The method of claim 1, wherein the method is performed by a user device, wherein the user device comprises one of a computer, a cellular phone, and a personal data assistant (PDA).

15. A method, comprising:

processing an electronic representation of a page of a document for determining whether the page is misaligned;

when a determination is made that the page is misaligned, generating a control signal adapted for use in triggering presentation of an alarm indicating that the page is misaligned, wherein the control signal is generated on a first copy device;

presenting the alarm on the first copy device in response to the control signal; and propagating the control signal from the first copy device toward a second copy device for triggering presentation of the alarm on the second copy device.

16. A method, comprising:

processing an electronic representation of a page of a document for determining whether the page is misaligned;

when a determination is made that the page is misaligned, generating a control signal adapted for use in triggering presentation of an alarm indicating that the page is misaligned, wherein the control signal is generated on a first copy device; and in response to the control signal, presenting the alarm on the first copy device and propagating an alarm message from the first copy device toward a second copy device, wherein the alarm message is indicative of the determination that the page is misaligned.

17. An apparatus, comprising:

a memory for storing an electronic representation of a page of a document; and a processor for:

processing the electronic representation of the page for determining whether the page is misaligned;

when a determination is made that the page is misaligned, generating a control signal adapted for use in triggering presentation of an alarm indicating that the page is misaligned; and performing at least one control action when a determination is made that the page is misaligned, wherein the at least one control action comprises at least one of:

when the document is intended for transmission via a network, providing a user with an option to continue with transmission of the document or to abort transmission of at least a portion of the document;

when the determination that the page of the document is misaligned is made while at least one page of the document is still being input via an automatic document feeder, automatically stopping the automatic document feeder; and automatically correcting the alignment of the misaligned page.

18. The apparatus of claim 17, wherein the processor is configured for:

propagating the control signal toward a copy device for triggering presentation of the alarm on the copy device.

19. The apparatus of claim 17, wherein the processor is configured for:

in response to the control signal, propagating an alarm message toward a copy device, wherein the alarm message is indicative of the determination that the page is misaligned.

20. A non-transitory computer readable storage medium storing instructions which, when executed by a processor, cause the processor to perform a method, the method comprising:

processing an electronic representation of a page of a document for determining whether the page is misaligned;

when a determination is made that the page is misaligned, generating a control signal adapted for use in triggering presentation of an alarm indicating that the page is misaligned; and performing at least one control action when a determination is made that the page is misaligned, wherein the at least one control action comprises at least one of:

when the document is intended for transmission via a network, providing a user with an option to continue with transmission of the document or to abort transmission of at least a portion of the document;

when the determination that the page of the document is misaligned is made while at least one page of the document is still being input via an automatic document feeder, automatically stopping the automatic document feeder; and automatically correcting the alignment of the misaligned page.

* * * * *